May 15, 1923.                1,455,389
W. S. CRANDELL
FRICTION DRIVING ELEMENT
Filed July 10, 1922
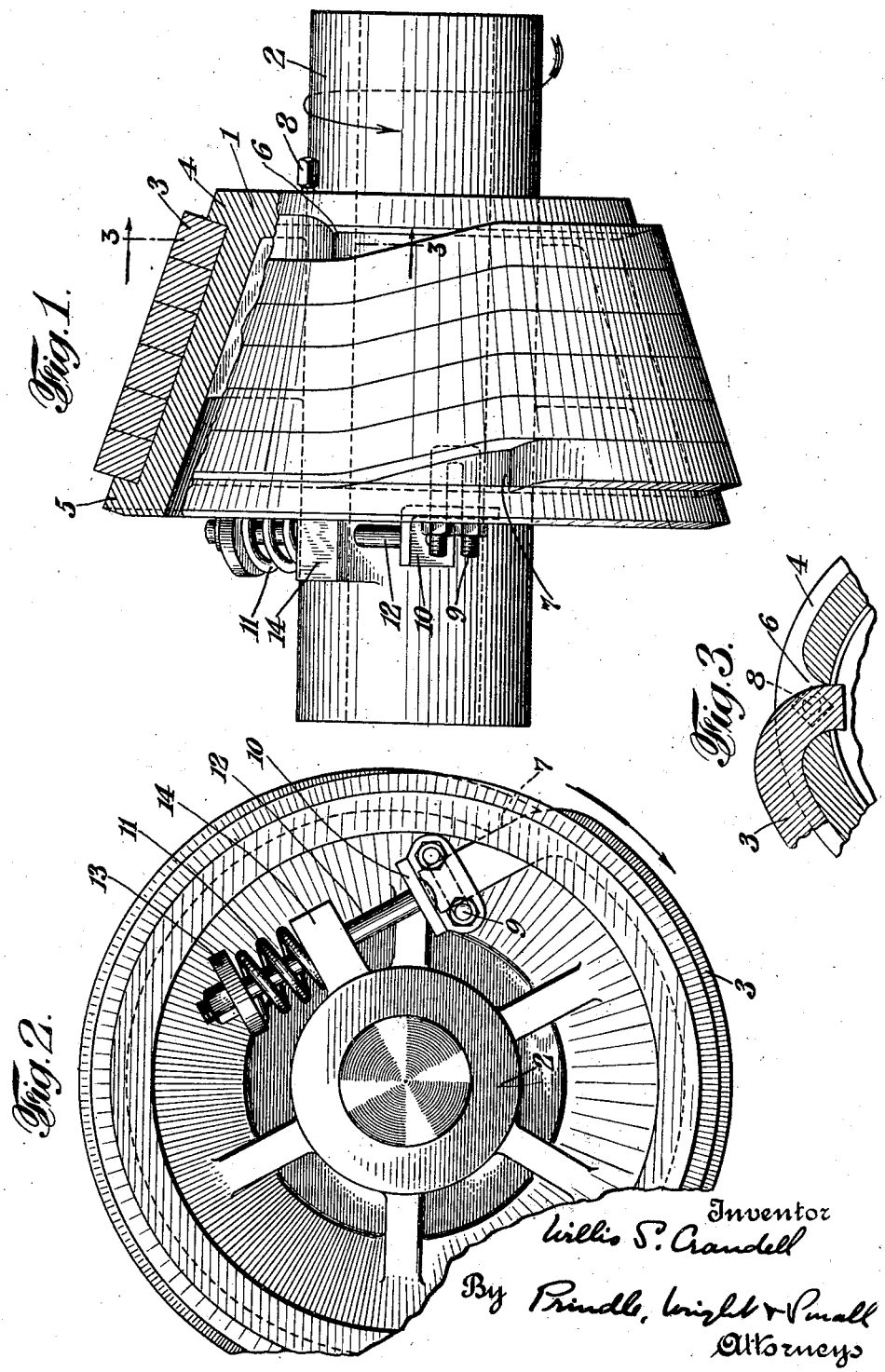

Patented May 15, 1923.

1,455,389

UNITED STATES PATENT OFFICE.

WILLIS S. CRANDELL, OF ELSMERE, NEW YORK, ASSIGNOR TO ALBANY PAPER MILL MACHINERY COMPANY, INC., OF ALBANY, NEW YORK, A CORPORATION OF NEW YORK.

FRICTION DRIVING ELEMENT.

Application filed July 10, 1922. Serial No. 573,902.

*To all whom it may concern:*

Be it known that I, WILLIS S. CRANDELL, a citizen of the United States, a resident of Elsmere, in the county of Albany and State of New York, have invented a certain new and useful Friction Driving Element, of which the following is a specification.

The invention has for an object to provide a friction gear or friction driving element wherein the material which is relied upon for the driving surface may be removed from the driving element while the latter is in operative position on the shaft, for example, to permit repairs to or replacement of such friction material.

Another object is to maintain such friction material in such proper relation on the driving element as to furnish a driving surface of uniform and proper quality while still permitting it to be readily removed as aforesaid. Further objects and advantages of the invention will be in part obvious and in part specifically pointed out in the description hereinafter contained, which, taken in connection with the accompanying drawings, discloses a preferred embodiment thereof; such embodiment, however, is to be considered merely as illustrative of its principle. In the drawings:

Fig. 1 is a side view of a friction driving element constructed in accordance with the invention, certain of its parts appearing in section.

Fig. 2 is an end view of the structure shown in Fig. 1.

Fig. 3 is a fragmentary sectional view taken on line 3—3 of Fig. 1 looking in the direction of the arrows.

If the friction driving element or gear be constructed of, or employing, a material in annular form, enclosing the shaft in connection with which the driving element is used, it is necessary to remove the driving element from such shaft, or to demount the shaft in case repairs to or replacement of the driving element is necessary, which operation often may involve demounting a substantial number of machine elements, and which requires so much time as to involve undue losses on account of enforced idleness of the machinery in connection with which the friction driving element is used.

According to the present invention, I construct the friction driving element of a supporting core 1, which ordinarily will be annular in form, and provided with a hub 2 if desired, and the material which is relied upon to furnish the friction driving surface is placed over or around the supporting core, not in the form of endless bands or disks which would require demounting the shaft to permit removal, but in the form of a strip or strips having ends capable of being freed from the core 1 to permit the friction material to be removed at any time without disturbing the supporting core or other parts of a power transmission apparatus. In the illustrated embodiment, this friction material is comprised of a strip 3, which may be of any suitable fabric, hide, composition or the like known to those skilled in the art as adapted for such purposes, and such strip 3 is wound spirally around the outer surface of the core member 1, the adjacent turns of the spiral being in contact with each other, and thus making up a substantially continuous friction driving surface over substantially the whole outer area of the core member.

As shown, the outer surface of the core member is conical, flanges 4 and 5 being provided respectively at its smaller and larger extremities to assist in holding the friction material in place.

The ends of the strip of friction material are suitably secured in position, this being accomplished in the present instance by providing holes 6 and 7 in the core member through which the ends of the strip 3 are passed into engagement with clamping devices. As is shown in Figs. 1 and 3, a bolt 8 may be passed through one wall of the supporting core 1 adjacent the hole 6 previously mentioned, and forced against the corresponding end of the strip 3 to hold the latter securely in position.

I prefer also to provide in the driving element, means for exerting tension on the friction material to maintain it taut against the outer surface of the core, or take up any stretch which may tend to occur therein. This result is secured in the present embodiment by employing a compression spring in connection with the device for securing in position the end of the strip 3 which passes through hole 7. As shown, a U-bolt 9 passes through an angle piece 10 and around one end of the strip 3 so as to hold the latter securely against the angle piece, such angle piece being resiliently urged to exert tension on the strip 3, for example, by means of a compression spring 11 surrounding a rod 12 extending from the angle piece, the spring 11 acting between a washer 13 on the end of such rod, and a lug 14 on the hub 2 of the supporting core, through which lug rod 12 is passed.

In replacing the friction material one end of the strip may be placed through hole 6 and secured by bolt 8, and the shaft carrying the driving element then rotated to wind the strip 3 tightly around its core, after which the remaining end of the strip may be passed through the hole 7 and secured in position as above described.

Where the covering of friction material is made up by winding or wrapping a strip of friction material around the core in spiral form as above described, I prefer to direct the pitch of the spiral (when wound from the fixed end of the strip) oppositely to the direction in which the driving element will turn in use, thus urging any looseness in the covering toward the end of the spiral at which the tension-exerting device is located, to insure that the covering will be maintained taut.

While a specific embodiment of the invention has been described, it will be obvious that many changes may be made therein without departing from the principle of the invention, as defined in the following claims.

I claim:

1. A friction driving element comprising an annular supporting core having an aperture therein, a covering over said core comprising a strip of friction material having an end projecting inwardly through said aperture, means for exerting tension on said inwardly projecting end of the strip comprising an angle piece secured to said end, a rod slidable with regard to said core and extending from said angle piece, and a spring urging said rod to maintain the strip taut over the core.

2. The combination set forth in claim 1, wherein the core is provided with a hub having a lug slidably receiving said rod, and said spring is interposed between said lug and a part on the rod.

In testimony that I claim the foregoing, I have hereunto set my hand this 28th day of June, 1922.

WILLIS S. CRANDELL.